Patented Dec. 15, 1942

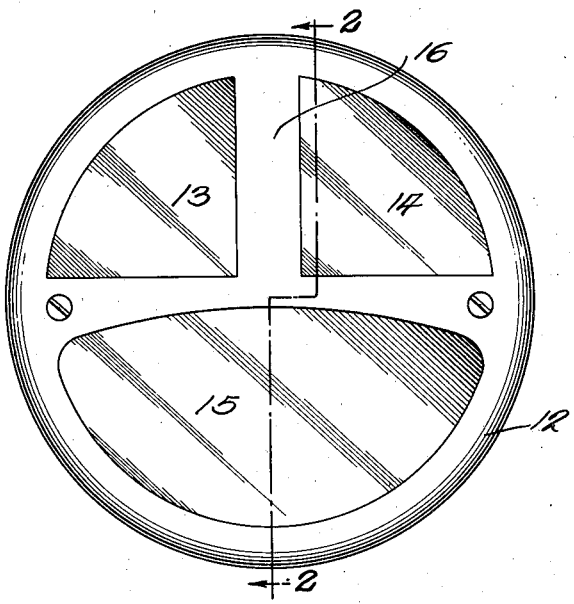
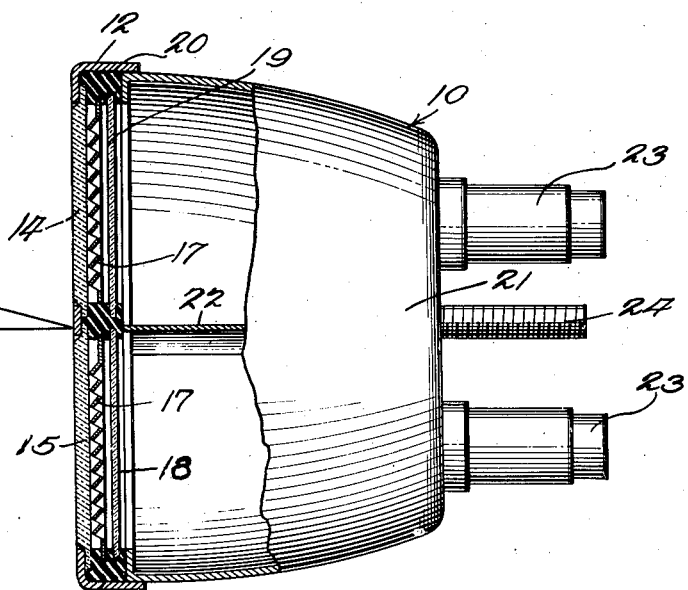

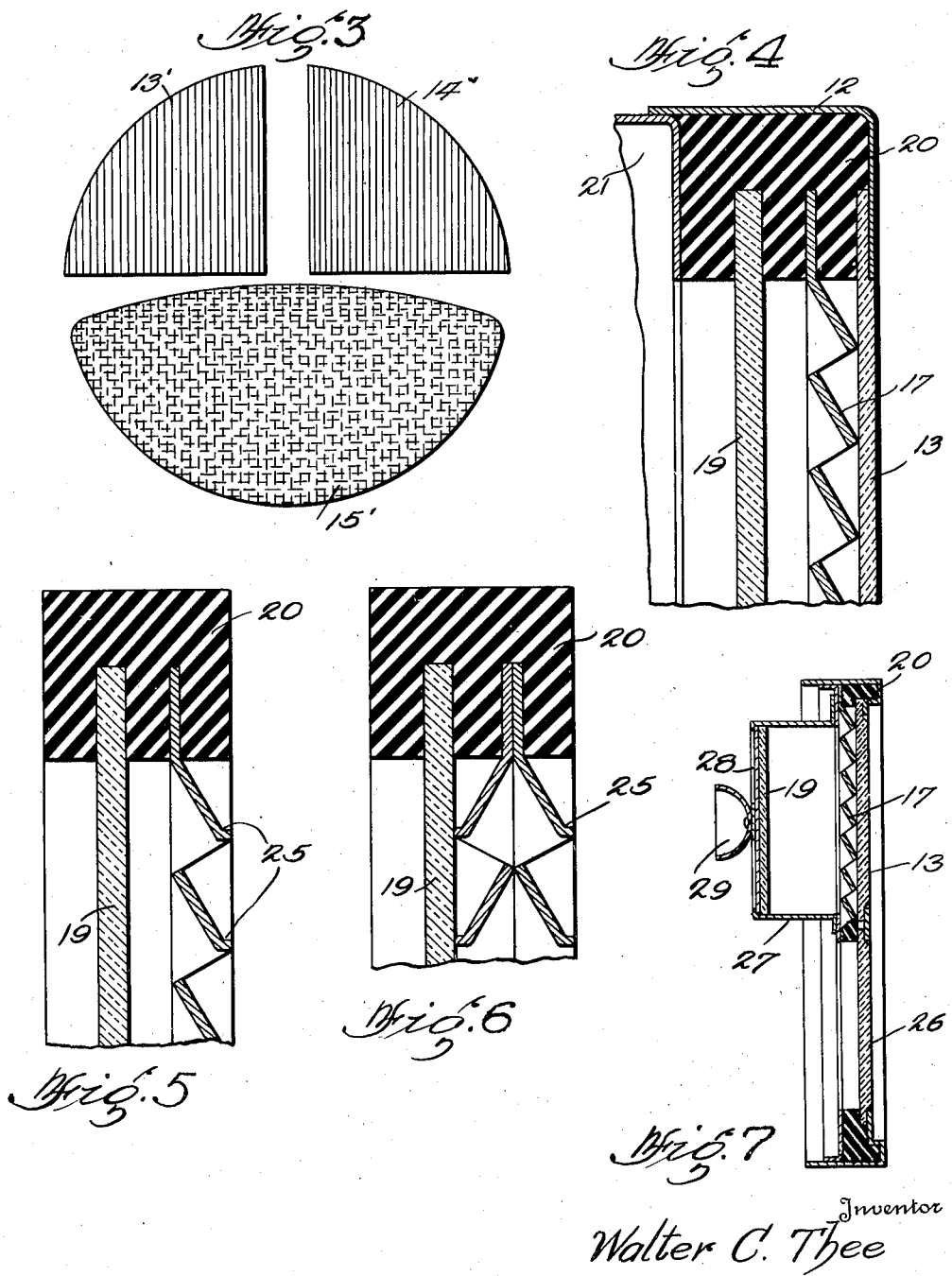

2,304,861

UNITED STATES PATENT OFFICE 2,304,861

BLACKOUT MEANS FOR AUTOMOBILE LAMPS

Walter C. Thee, United States Army, Baltimore, Md.

Application April 19, 1941, Serial No. 389,300

3 Claims. (Cl. 240—48.4)

(Granted under the act of March 3, 1883, as amended April 30, 1928; 370 O. G. 757)

The invention described herein, if patented may be manufactured and used by or for the Government for governmental purposes without the payment of any royalty thereon.

This invention relates to night-lighting equipment and more particularly to means to be used during blackouts for driving, stationary, or reversing lamps, and more especially lights to be used for motor vehicles or other purposes, to prevent collisions, by providing means whereby a driver of an oncoming vehicle or of a trailing vehicle may see other vehicles traveling on the road at night, said lights, however, not being visible to the pilot or to an observer in a low-flying airplane.

The present invention has been developed after many experimental lights have been tried and have failed to function as desired. Various tests have been made and it has been determined through experimentation that the visibility of the lights can be varied from 300 to 2,000 feet, more or less, by the angle in which these lamps are placed from a horizontal position. This would apply where the vertical angles are not more than 30 degrees, or not less than 15 degrees above and below the axis of the unit, with horizontal angles of 60 degrees on either side of the axis of the unit. If the angles are more or less than those referred to, the unit would become invisible, and for this reason the lights are, as have been pointed out, not visible to low-flying aircraft. These lights, as made, will not produce any reflection on the fender of the motor vehicle and it will eliminate the reflection of the sun on oncoming or trailing traffic or on any other lamps that may be encountered.

Hence, an important object of this invention is to provide a lighting unit adapted to emit or release horizontal light rays of predetermined intensity, thereby avoiding downward or upward reflection.

Another important object of this invention is to provide means whereby light rays may be emitted only over predetermined horizontal angles from the axis of the unit.

A further object of the invention is to provide elements requiring only slight modifications to accomplish various results as to vertical and horizontal light ray discharge and intensity of same.

A further object of this invention is to provide a structure that may be produced as an article of manufacture suitable for application to standard equipment lamps in general use.

With the above and other objects and advantages in view, the invention consists of features of construction, arrangement and operation of parts, which will appear in the specification and be finally pointed out in the claims.

While the preferred embodiment of the invention is shown, it will be understood that slight changes in form and minor details of construction may be resorted to without departing from the spirit of the invention and fall beyond the scope of the claims.

Referring now to the drawings, in which similar characters and references in the several figures indicate identical parts:

Fig. 1 is an elevation of the face of the improved lamp.

Fig. 2 is a side elevation partly broken away.

Fig. 3 shows a modification of the lenses shown in Fig. 2 separate from the lamps wherein the upper lenses are red and the lower one being yellow.

Fig. 4 is an enlarged detail vertical section of the lamp showing the filter and the louvre.

Fig. 5 is a modified form of louvre with the lower edge turned from an angle to the horizontal.

Fig. 6 is a detail modified form wherein double louvres are shown back to back.

Fig. 7 is a detail showing a further modified form wherein a reflector is mounted to the rear of the filter and louvre.

Reference now being made to the drawings by numeral, 10 indicates a lamp embodying preferred features of the invention secured to the rear of a motor vehicle 11. The lamp 10 comprises a frame 12 holding two clear plain glass lenses 13 and 14 and a clear plain or red glass lens 15, as shown in Fig. 1. There is shown in Fig. 3 a modification of the invention in which the lenses 13' and 14' are indicated as being red and the lens 15' is indicated as being yellow. This modification, therefore, differs from Fig. 1 since, as shown, the lenses 13 and 14 are clear, plain lenses and lens 15 is red. This lamp is of the construction ordinarily employed upon vehicles, such as automobiles.

The lenses 13 and 14 have the approximate shape of a quarter-circle, while the lens 15 is approximately half a circle. The frame 12 has an upright separator 16 between lenses 13 and 14 and a horizontal separator between the lower lens 15 and the upper lenses 13 and 14. This combination produces a stereoscopic effect which enables a driver of a trailing vehicle or any other person observing the lamp to judge the approximate distance the observer is from the lamp. At approximately 30 yards, the lamp appears as two lights, at distances greater than 30 yards the lamp appears as one light, and at distances of 10 yards or less the individual louvres, referred to later in the specification, or a series of horizontal rays can be seen.

Immediately behind the lens, either contacting them or spaced a little apart therefrom, is a louvre or light control mechanism 17, which may be made from metal, plastics, or any other materials, of any desired shape. The louvres may be made at 30 degrees, 45 degrees, and 60 degrees, or any other angle and shape or modification thereof. The louvre has a blackened, dull matt, black finish, to eliminate undesirable reflection from the source of light.

Immediately to the rear of the louvre 17 is a lower light filter 18, which may be yellow amber, or any other variations of yellow that may be obtained. The upper light filters 19 immediately in the rear of the louvre 17 are red or any variations thereof. These filters may at any time be replaced with blue filters and, in some instances, blue filters have been found to be more efficient, especially if the lamps are to be used on the front of the vehicle as a head-light during blackouts.

The lens, louvres, and filters are made into a unitary structure by means of a rubber gasket 20, and in this way the entire unit can be replaced upon breakage of a unit, or the unit can be placed in any conventional lamp, thereby providing a universal attachment that may be used for any type of lamp now in use on all modern vehicles. The rubber gasket is secured in place between the frame 12 and shell 21 of the lamp, which is divided into upper and lower sections by means of a partition 22. Secured to the rear of the lamp are the usual electrical sockets 23 and the lamp 10 is adapted to be secured to the motor vehicle by any well-known means, such as bolt 24.

Referring now more particularly to Fig. 5, wherein there is shown a modified form of louvre, having the lower end of the louvre 17 turned outward from the angle to a horizontal position as shown at 25, the unit remains as previously described, except for this particular feature of the louvre.

In Fig. 6 there is another modification of the invention wherein double louvres, such as shown in Fig. 5, are placed back to back and, as previously described, the louvres can contact the lens and filter or a small space can be left between the lens, filter and louvre.

In Fig. 7 a further modification of the invention shows the louvre 17 only, placed in the upper portion of the unit, leaving the lower lens 26 free of any louvre. The lens 26, being the usual red lens used in the conventional vehicle tail-light.

In Fig. 7, the filter 19 is enclosed in a box-like frame 27, which is open at the rear, except for a vertical portion 28, which corresponds and aligns itself with the separator 16 of the frame 12. Mounted on the rear of this vertical portion 28 is a reflector 29, which traps the light from the usual light filament incorporated in the vehicle light. This reflector will trap any bright light that might collect along the edges of the separator 16, and reflect the light back to the rear of the shell 21, where it again will be reflected back through the filters, louvre and lens. The interior of the shell 21 may be coated both top and bottom with aluminum paint, or both top and bottom may be coated with a dull black, and these coatings can be reversed so that either the top or the bottom may be coated with aluminum and either the top or the bottom may be coated with black.

In the operation of the device as shown in Figs. 1 to 4, beams of filtered light will be transmitted through the louvre and only horizontal and downwardly inclined beams will be transmitted by the louvre through the lens, since the angle of the louvre will prevent the upwardly directed beams from being transmitted therethrough. This will prevent observers or pilots in enemy aircraft from seeing the beams of the lamp, while still permitting the drivers of trailing or approaching vehicles to view the lights up to 2,000 feet. It will be apparent, therefore, that the light as thus filtered, is sufficient to adequately announce the approach of a vehicle and yet it is not of sufficient illumination, due to the louvres, to be observed from the air.

The operation of the modified forms of the invention shown in Figs. 5, 6 and 7 is identical with that described in connection with Figs. 1 to 4, except that lamps that are placed on reflecting surfaces, such as fenders, etc., are more apt to have the light rays therefrom reflected from said surfaces unless two louvres are used. To make this adjustment in the usual structure, it is only necessary to remove the unit within the rubber gasket 20, as shown in Fig. 2, and replace it with the unit as shown in Figs. 5, 6 or 7.

The invention, therefore, exemplifies a night-lighting equipment that may be used to advantage during blackouts, and one that can be attached as a unit to the usual lamp of any standard motor vehicle.

The invention is not to be understood as restricted to the details set forth, since these may be modified within the scope of the appended claims without departing from the spirit and scope of the invention.

Having thus described the invention, what is claimed as new and desired to secure by Letters Patent is:

1. Night lighting equipment comprising a frame, lens holding means adapted to be retained in place on the casing of an automobile lamp by said frame, filter means mounted in said lens holding means at the top and bottom thereof, means mounted in said lens holding means in a position forward of said filter means to prevent the emission of upwardly directed rays, said means having non-reflecting transverse partitions extending downwardly at an angle from the horizontal, the forward edges thereof being bent upwardly in parallel relation.

2. Night lighting equipment comprising a frame, lens holding means adapted to be retained in place on the casing of an automobile lamp by said frame, filter means mounted in said lens holding means at the top and bottom thereof, means mounted in said lens holding means in a position forward of said filter means to prevent the emission of upwardly directed rays, said means having non-reflecting transverse partitions extending downwardly in both directions at an angle from the horizontal, the forward edges thereof being bent upwardly in parallel relation.

3. Night lighting equipment comprising a box-like frame adapted to be retained in place on the casing of an automobile lamp to cover only the top portion thereof, filter means mounted in said frame, means mounted in said frame in a position forward of said filter to prevent the emission of upwardly directed rays, said means having non-reflecting partitions extending downwardly at an angle from the horizontal and reflecting means secured to the rear portion of said box-like frame to reflect rays of light backward within said automobile lamp.

WALTER C. THEE.